United States Patent [19]

Mehesan, Jr.

[11] 4,286,917

[45] Sep. 1, 1981

[54] BOOM MOUNTED CARRIER FOR HANDLING BEEF QUARTERS AND THE LIKE

[75] Inventor: Thomas C. Mehesan, Jr., Hospers, Iowa

[73] Assignee: Banner Industries, Inc., Hospers, Iowa

[21] Appl. No.: 68,202

[22] Filed: Aug. 20, 1979

[51] Int. Cl.³ .............................. B66C 1/22; B66C 1/42
[52] U.S. Cl. ...................................... 414/704; 414/729; 294/67 BA
[58] Field of Search ................ 414/729, 739, 740, 741, 414/704, 722, 721; 294/67 BA, 86 R, 103 R

[56] References Cited

U.S. PATENT DOCUMENTS

| | | | |
|---|---|---|---|
| 1,280,933 | 10/1918 | Wright | 294/86 R |
| 2,624,611 | 1/1953 | Knapp | 294/103 |
| 3,057,496 | 10/1962 | Garske | 414/685 X |
| 3,193,319 | 7/1965 | Frock et al. | 414/721 X |

FOREIGN PATENT DOCUMENTS 58017  9/1953  France ..................................... 414/721

Primary Examiner—David A. Scherbel
Attorney, Agent, or Firm—Zarley, McKee, Thomte, Voorhees & Sease

[57] ABSTRACT

A carrier apparatus adapted to be mounted on one end of an elongated boom arm for handling beef quarters and like loads includes an upstanding rear wall structure adapted for securement to said boom arm, a load support platform extended forwardly from the lower end of the rear wall structure, a side member extended forwardly from one side of the rear wall structure and a gate mechanism supported on the rear wall structure for movement between a loading position displaced from the forward surface of the wall structure whereby a load may be received on the platform in leaning engagement against the rear wall structure and a carrying position wherein the gate mechanism is extended forwardly and laterally across the forward surface of the wall structure for at least partially enclosing the load between the side member, wall structure and gate mechanism. Both the platform and rear wall structure may be arcuately shaped with the gate mechanism adapted to be circumferentially advanced about the outer circumference of the rear wall structure.

8 Claims, 14 Drawing Figures

U.S. Patent  Sep. 1, 1981  Sheet 1 of 3  4,286,917
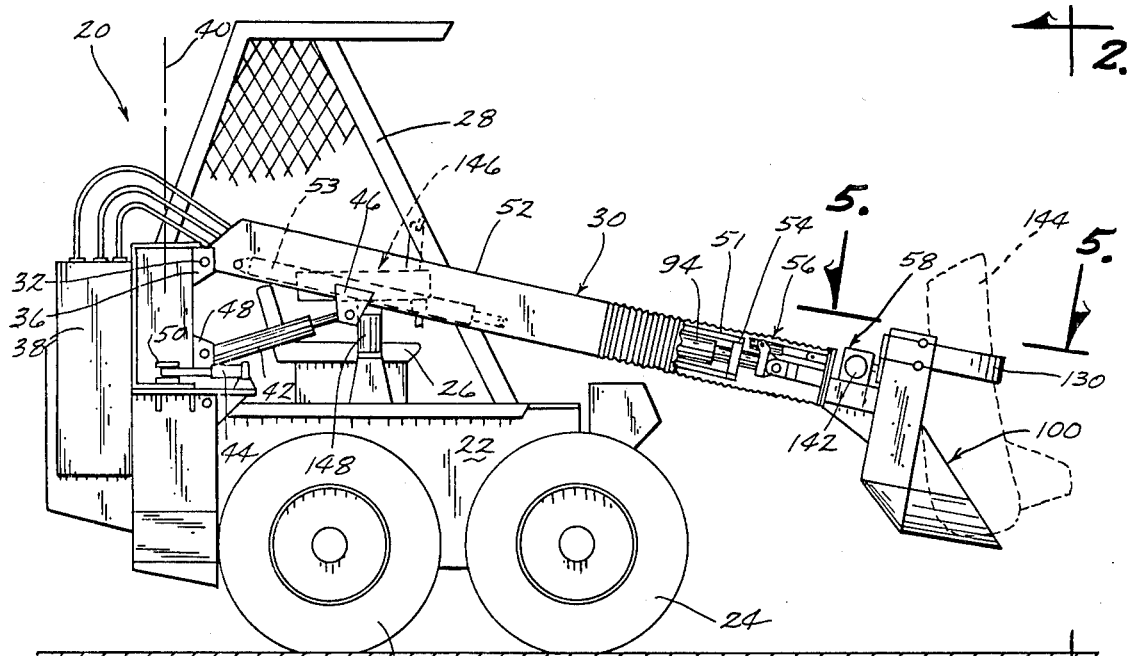
Fig. 1
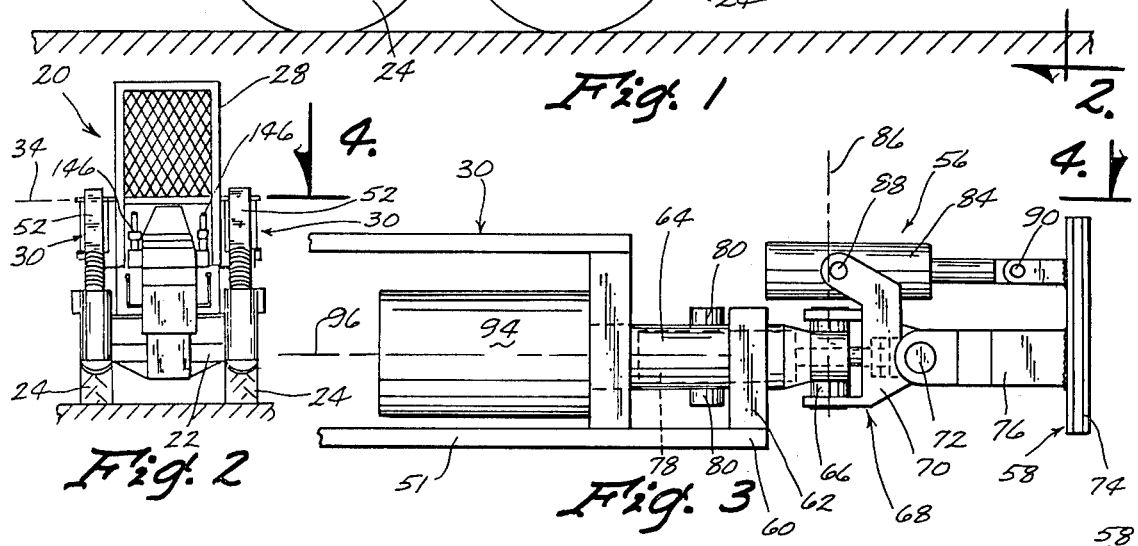
Fig. 2
Fig. 3
Fig. 4

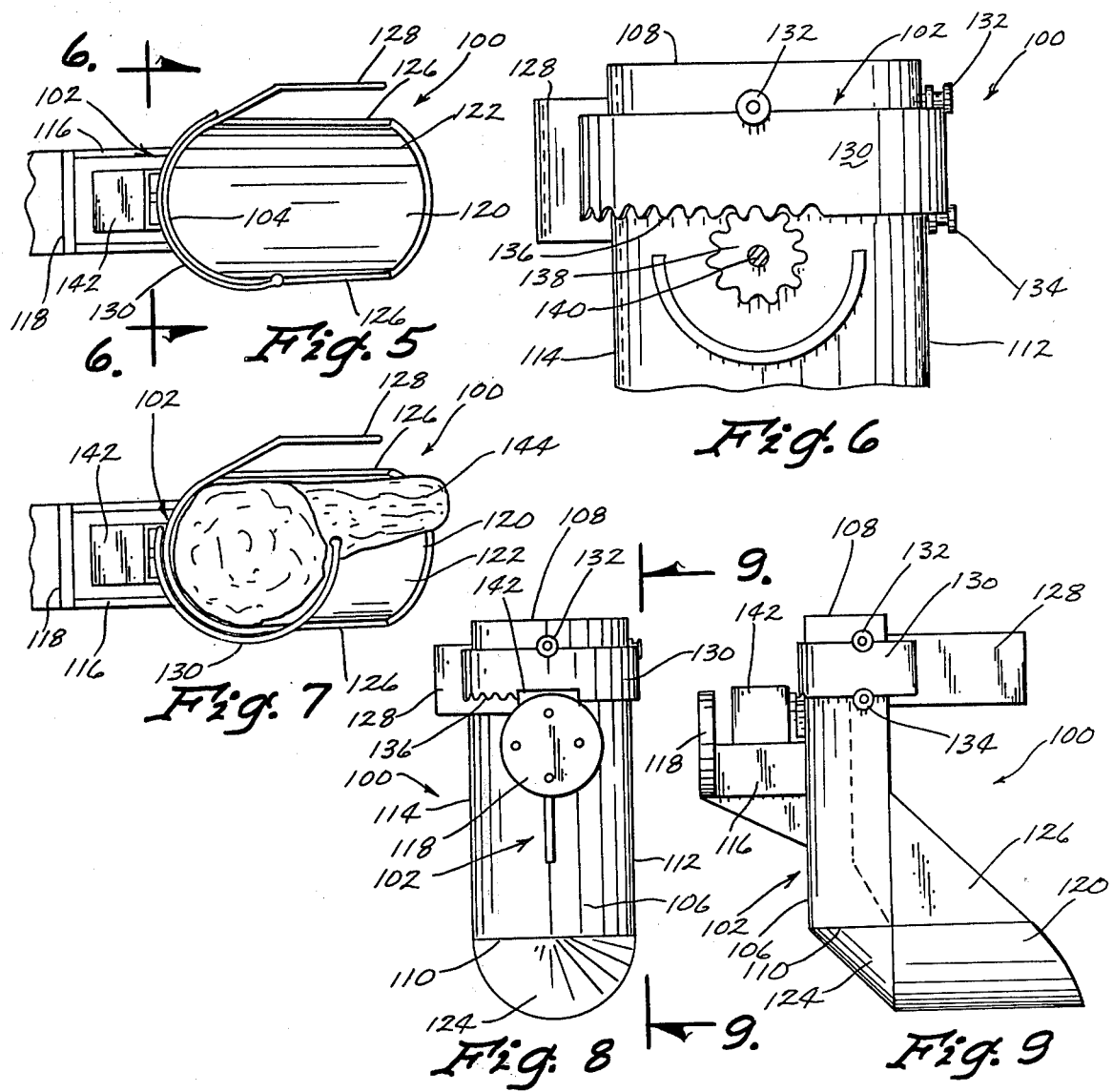

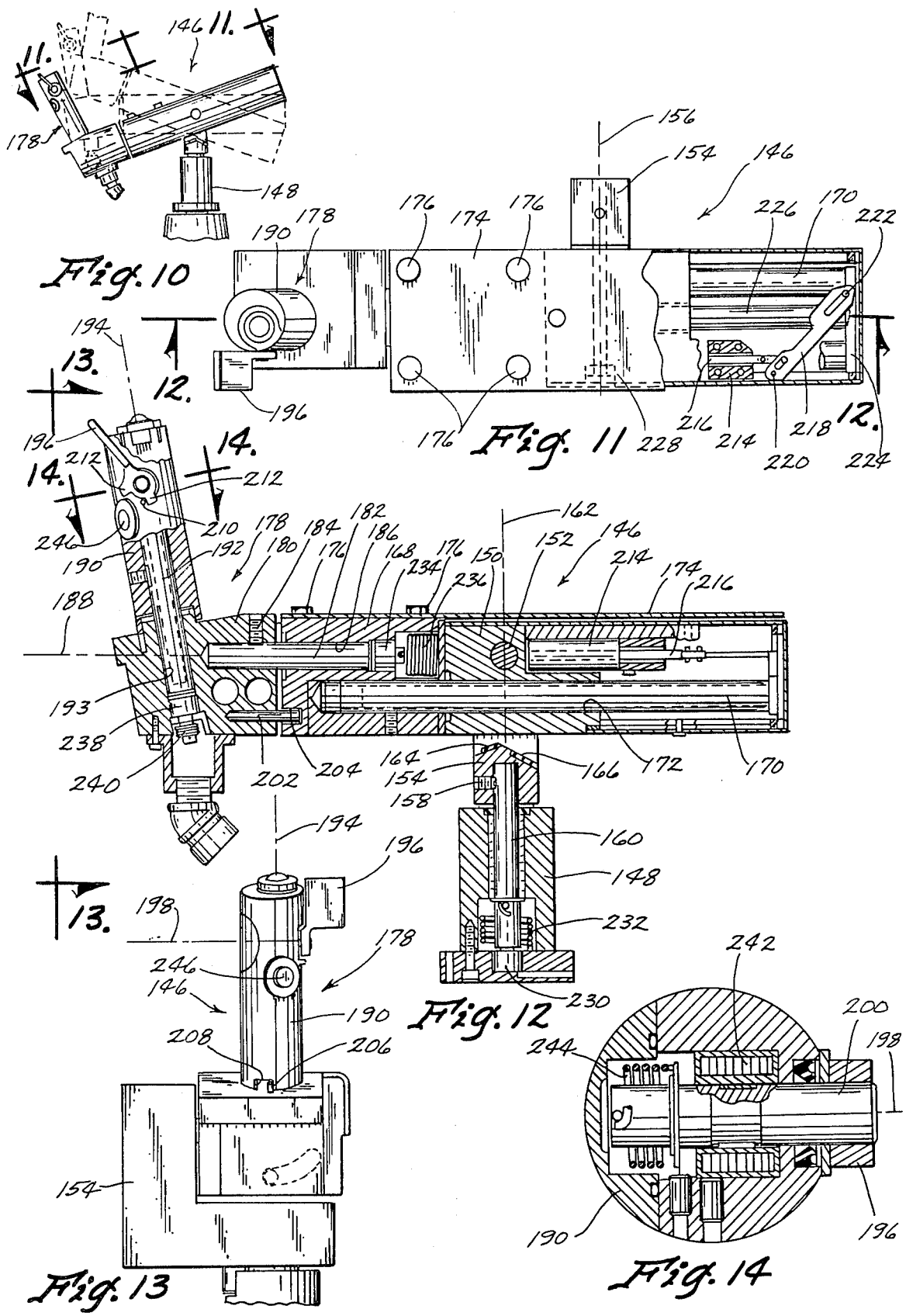

BOOM MOUNTED CARRIER FOR HANDLING BEEF QUARTERS AND THE LIKE

BACKGROUND OF THE INVENTION

The carrier apparatus of the present invention relates generally to a boom mounted apparatus for supporting a load and more particularly to a boom mounted carrier particularly adapted for loading, transporting and unloading beef quarters and like loads.

Beef quarters are generally handled by conventional material handling vehicles such as a fork lift provided with a bucket on the forward end thereof. In a meat packing plant, beef quarters must be manhandled, hung on hooks and otherwise manipulated. These maneuvers are very difficult with existing equipment and generally require a two man operation, one to drive the load handling vehicle and one to properly position the beef quarters within the boom supported bucket or the like. Furthermore, I have presently invented a load handling apparatus equipped with a boom capable of several degrees of movement and for which conventional carrier apparatus are not advantageously suited. Accordingly, there is a need for a carrier apparatus particularly suited for handling beef quarters and the like which would eliminate the necessity for a second operator to position the beef quarters and like loads thereon.

A primary object of the invention is therefore to provide an improved boom supported carrier apparatus.

A further object is to provide an improved boom mounted carrier apparatus which is particularly adapted for handling beef quarters and the like.

A further object is to provide an improved boom mounted carrier apparatus adapted to receive, transport and unload beef quarters and the like without manual assistance.

A further object is to provide a boom mounted carrier apparatus adapted for assembly with a boom arm capable of several degrees of movement.

Finally, an object is to provide a boom mounted carrier apparatus which is simple and rugged in construction and efficient in operation.

SUMMARY OF THE INVENTION

The carrier apparatus of the present invention is adapted to be mounted on an elongated boom arm for handling beef quarters and like loads. An upstanding rear wall structure is adapted to be secured to a boom arm which is equipped with a load support platform extended forwardly from its lower end. A side member extends forwardly from one side of the rear wall structure and a gate mechanism is supported for movement between a loading position wherein it is substantially displaced from the forward surface of the wall structure so that a load may be received on the platform in leaning engagement against the rear wall structure, and a carrying position wherein the gate mechanism is extended forwardly of and laterally across the forward surface of the wall structure for at least partially enclosing the side member, wall structure and gate means. The platform may be arcuately shaped for loading beef quarters and the like at various inclinations of the rear wall structure. The rear wall structure may likewise by arcuately shaped for circumferential movement of an arcuate gate mechanism along the rear surface thereof.

BRIEF DESCRIPTION OF THE DRAWINGS

FIG. 1 is a side elevational view of a load handling apparatus of the invention;

FIG. 2 is a reduced front view of the load handling apparatus, as seen on line 2—2 in FIG. 1;

FIG. 3 is an enlarged, partially fragmented side detail view of the wrist mechanism of the invention;

FIG. 4 is a top view of the wrist mechanism as seen on line 4—4 in FIG. 3;

FIG. 5 is a top view of the boom mounted carrier, as seen on line 5—5 in FIG. 1;

FIG. 6 is an enlarged rear partially sectional and fragmented view of the carrier as seen on line 6—6 in FIG. 5;

FIG. 7 is a top view of the carrier, similar to FIG. 5, showing a beef quarter supported thereon;

FIG. 8 is a rear elevational view of the carrier;

FIG. 9 is a side elevational view of the carrier as taken along line 9—9 in FIG. 8;

FIG. 10 is a side elevational view of the control arm of the invention;

FIG. 11 is an enlarged plan view of the control arm taken along line 11—11 in FIG. 10 with portions broken away for clarity;

FIG. 12 is a side elevational view of the control arm assembly as taken along line 12—12 in FIG. 11;

FIG. 13 is a front end view of the control arm assembly as seen on line 13—13 in FIG. 12; and FIG. 14 is an enlarged detail sectional view of the control arm handle taken along line 14—14 in FIG. 12.

DESCRIPTION OF THE PREFERRED EMBODIMENT

The load handling apparatus of the present invention, indicated generally at 20 in FIG. 1, includes a movable vehicle having a frame 22 supported on front and rear ground wheels 24. The apparatus is preferably self-propelled and includes an operator's seat 26 situated within a screened protective cage structure 28. The basic vehicle as thus far described is conventional and may be constructed as a modification of such commercially available units as the Melroe 310 Bobcat, for example. Such modification would preferably include foot pedal steering controls in order to free the operator's hands for use as described hereinbelow.

Referring to FIGS. 1 and 2, an elongated boom arm 30 is supported at one end by a pivot pin 32 for pivotal movement about a first horizontal axis 34. It can be seen in FIG. 2 that a pair of identical boom arms 30 are mounted on opposite sides of the vehicle frame 22. Accordingly, like reference numerals will be used to describe like parts of each with the understanding that a pair of axes referred to by the same reference numeral are not necessarily aligned, parallel or otherwise related. Pivot pin 32 rotates within a bracket 36 of an upstanding collar 38 which pivots about a first vertical axis 40 on an upstanding frame post (not shown). The boom arm is operated by a primary power means including an extensible and retractable hydraulic cylinder unit 42 for raising and lowering the boom arm 30 and a second hydraulic cylinder unit 44 for transverse pivotal movement of the boom arm 30 about the vertical axis 40. Hydraulic cylinder 42 is pivotally connected between a depending bracket 46 on boom arm 30 and a forwardly extending bracket 48 which is secured to a lower portion of sleeve 38 in vertical alignment with bracket 36. Hydraulic cylinder 44 is pivotally connected at one end to frame 22 and at the other end to a bracket 50 mounted on the side of sleeve 38 whereby the sleeve is rotated in response to extension and retraction of hydraulic cylinder 44. The boom arm 30 itself is of telescopic construction and may be extended and retracted by operation of an internally mounted hydraulic cylinder unit 53. Accordingly, the free end 54 of boom arm 30 may be linearly extended and retracted, as well as pivoted about the first horizontal axis 34 and first vertical axis 40. Boom arm 30 includes inner and outer boom sections 51 and 52.

A wrist mechanism 56 connects a load support member 58 to the free end 54 of boom arm 30 with freedom of pivotal movement much like the freedom of movement of a person's hand relative to his forearm. Referring to FIGS. 3 and 4, the inner boom section 51 includes a lower extension 60 having an upstanding bearing block 62 thereon which supports an elongated shaft 64, the forward end of which is connected to a pin 66 of a universal joint 68. The universal joint includes a yoke 70 pivotally supported on pin 66 and adapted to carry a second pin 72 which is disposed perpendicular to pin 66. The load support member 58 includes a generally flat mounting plate 74 rigidly connected to a rearwardly extended yoke 76 which is pivotally supported on pin 72.

A secondary power source for pivotally moving the load support member 58 relative to the boom arm 30 includes an hydraulic cylinder unit 78 pivotally connecting a pair of ears 80 on shaft 64 and a pair of ears 82 on the universal joint yoke 70 for pivotally moving mounting plate 74 about a first axis 86, that of pin 66. Another hydraulic cylinder unit 84 is pivotally interconnected between the universal joint yoke 70 and mounting plate 74 by pins 88 and 90 for pivotal movement of mounting plate 74 about a second axis 92 which is disposed perpendicular to the first axis 86. In addition, the shaft 64 is operatively connected to the output shaft of a hydraulic actuator 94 for rotation of mounting plate 74 about a third axis 96 disposed perpendicular to both the first axis 86 and second axis 92 and generally aligned with the longitudinal center line of boom arm 30.

Referring to FIG. 5, a carrier 100 is mounted on plate 74 for advantageously handling beef quarters and the like. For purposes of describing the carrier, the term boom arm shall be considered to include the extensible member 30, the wrist mechanism 56 and the mounting plate 74.

Carrier 100 includes an upstanding rear wall structure 102 having a forward surface 104, a rearward surface 106, upper and lower ends 108 and 110 respectively and opposite sides 112 and 114. Wall structure 102 is arcuate in top cross section, having a concave forward surface 104 and convex rearward surface 106. A mounting structure 116 is secured to and extended rearwardly from a central position on the rear wall structure for securement of an upstanding plate portion 118 thereof to mounting plate 74 by bolts or other suitable means. A load support platform 120, also arcuately shaped to present a concave upper surface 122 is connected to the rear wall structure 102 adjacent the lower end 110 thereof and extended forwardly therefrom. An arcuate closure plate 124 interconnects the rear wall structure 102 and platform 120 as do a pair of gusset plates 126. A side member 128, which may be formed integrally with rear wall structure 102, extends forwardly from the side 114 of wall structure 102 to laterally support a load carried on platform 120. Finally, an arcuate gate 130 is circumferentially engaged about the wall structure 102 and movably supported thereon by upper and lower guide rollers 132 and 134. A rearward portion of gate 130 is provided with a rack 136 of teeth along the lower edge thereof which are adapted for engagement with a pinion gear 138 rotatably supported adjacent wall structure 102 on the output shaft 140 of an electric motor 142. Accordingly, upon actuation of motor 142, gate 130 is circumferentially advanced relative to wall structure 102 between the loading position of FIG. 5 and the carrying position of FIG. 7. In the loading position, gate 130 is laterally or circumferentially displaced from the forward surface 104 of wall structure 102 so that a beef quarter 144 or like load may be received onto platform 120 in leaning engagement against forward surface 104. In the carrying position, gate 130 is extended forwardly of and laterally across the forward surface 104 of wall structure 102 to thereby at least partially enclose the beef quarter 144 between the side member 128, wall structure 102 and gate 130. Because of the arcuate shape of platform 120, carrier 100 is readily adaptable to scoop up a beef quarter in shovel-like fashion when the wall structure 102 is disposed at various inclinations relative to vertical. Accordingly, the carrier may be advanced by the boom arm at whatever disposition is required to receive a particular beef quarter whereupon gate 130 may be closed to retain the beef quarter thereon and the entire assembly may be lifted on the boom arm and transported to any desired position or location.

Referring now to FIGS. 10-14, there is shown a manually operated control arm 146 which is rotatably supported on a pedestal 148 located adjacent the operator's seat 26 on the truck frame 22 as seen in FIG. 1. In FIG. 2, it is seen that a pair of independent control arms 146 are supported on opposite sides of seat 26 for independantly controlling the operation of the respective adjacent boom arms 30.

Control arm 146 includes a base member 150 pivotally supported on a transverse shaft 152 of a generally L-shaped support member 154 for pivotal movement of the control arm about a second horizontal axis 156. Support member 154, in turn, is secured by a set screw 158 to a depending shaft 160 which is pivotally received within the pedestal 148 for pivotal movement of the control arm about a second vertical axis 162. Note that the support member 154 is provided with a pair of bearing pads 164 and 166 adapted to engage the underside of base member 150 when the control arm is in the downwardly inclined solid line position of FIG. 10 and upwardly inclined dotted line position respectively. Finally, control arm 146 includes a slide block 168 having a pair of transversely spaced apart rearwardly extended shafts 170 slidably received within longitudinal bores 172 in base member 150 so that the control arm 146 may be extended and retracted in response to longitudinal movement of slide block 168 and shafts 170 relative to base member 150. A cover member 174 is secured to slide block 168 by bolts 176.

A control handle, indicated generally at 178, includes a base member 180 having a pivot shaft 182 secured thereto by a set screw 184 and extended rearwardly therefrom for receipt within a longitudinal bore 186 of slide block 168. Accordingly, control handle 178 is pivotal about a sixth axis 188, that of shaft 182.

A handle member 190 extends upwardly from base member 180 and is pivotally connected thereto by a depending shaft 192 which is pivotally received within an upright bore 193 in the base member 180. Accordingly, handle member 190 is supported for pivotal movement about a fifth axis 194, that of shaft 192. Note that the fifth axis 194 is generally perpendicular to sixth axis 188 although slightly forwardly inclined relative thereto.

Finally, a thumb lever 196 is pivotally secured to handle member 190 for pivotal movement about a fourth axis 198, that of the shaft 200 on which the thumb lever 196 is mounted as shown in FIG. 14.

Pivotal movement of the handle member about each of the fourth, fifth and sixth axes is limited to the extent of desired pivotal movement for the load support member 58 about the first, second and third axes respectively. For example, in FIGS. 12 and 13, a pin 202 in base member 180 cooperates with a slot 204 in slide block 168 to limit pivotal movement about sixth axis 188. In FIG. 13, it is seen that an upstanding pin 206 cooperates with a cut out portion 208 of handle member 190 to limit pivotal movement about fifth axis 194 and a transverse pin 210 on handle member 190 provides a stop for flanges 212 on thumb lever 196 to limit pivotal movement about fourth axis 198.

In order to control movements of the boom arm 30 and load support member 58 by the control arm 146 and control handle 178 it is first necessary to sense the pivoted and linear positions of these members. For this purpose, a control transducer 214, in the form of a linear variable differential transformer (LVDT) is secured to the control arm base member 150 for sensing the relative extension thereof. LVDT 214 has a slidable core 216 which is shown in FIGS. 11 and 12 as connected by a pin and slot connection to a lever 218 having one end pivotally connected to base member 150 by a pin 220 and the opposite end pivotally connected by a pin 222 to a cross member 224 which is longitudinally slidable with shafts 170 and slide block 168. Accordingly, extension of control arm 146 effects a pivotal movement of lever 218 which causes a reduced linear movement of core 216 to vary the signal received from LVDT 214 when an excitation voltage is applied thereto. A compression spring (not shown) is to be fitted onto a central alignment shaft 226 for biassing the control arm to its fully retracted position shown in FIGS. 11 and 12.

Likewise, a second control transducer 228 in the form of a rotational variable differential transformer (RVDT) is operatively connected to horizontal shaft 152 for sensing the pivoted position of the control arm about the second horizontal axis 156. In FIG. 12, a third RVDT 230 is shown connected to the lower end of shaft 160 for sensing the relative pivoted position of the control arm about the second vertical axis 162. A spring 132 is connected to the pedestal 148 and shaft 160 to bias the control arm to a home position directed longitudinally of the vehicle frame 22. A similar fourth RVDT 234 is operatively connected to shaft 182 for sensing the pivoted position of the control handle 178 about sixth axis 188. Spring 236 biases the handle member 190 to an upright home position. A fifth control transducer, an RVDT, is secured to upright handle shaft 192 for sensing the relative pivoted position of the handle member 190 about fifth axis 194 and a spring 240 biases shaft 192 to a centered home position. Finally, a sixth control transducer 242, an RVDT, is operatively connected to the thumb lever shaft 200 for sensing the relative pivoted position of the thumb lever 196 about fourth axis 198 and a spring 244 biases thumb lever 196 to the home position indicated in FIG. 12.

A corresponding set of feedback transducers (not shown) are operatively connected in conventional manner to the boom arm 30 and wrist mechanism 56 for sensing the relative extension of the boom arm, its relative pivoted position about first horizontal axis 34 and first vertical axis 40 and the relative pivoted positions of the load support member 58 about first axis 86, second axis 92 and third axis 96.

The control transducers and feedback transducers are electrically connected to a processor (not shown) which delivers an excitation voltage to each of the transducers for receiving position indicating signals therefrom. The processor is also electrically connected to solenoid actuated control valves for moving each of the hydraulic power units in opposite directions.

In operation, all that the operator need do to handle a beef quarter is to manipulate the control arm 146 and handle 178 to cause the boom arm 30 and load support member 58 to duplicate those movements respectively for manipulation of the carrier assembly much like the action of a human hand. Note that a gripper switch 246 is provided on the handle member 190 for actuating electric motor 142 to move the carrier gate 130 between its loading and carrying positions.

For purposes of the reproduced motion, note that the first horizontal and vertical axes for the boom arm correspond to the second horizontal and vertical axes for the control arm and the relative extension of each member is correspondingly related. Likewise, the first, second and third axes of the wrist mechanism correspond to the fourth, fifth and sixth axes associated with at least portions of the control handle 178.

The control circuitry for the processor may be constructed according to conventional practice from a commercially available bidirectional controller such as that manufactured by Ledex of Dayton, Ohio and disclosed on their drawing number 266 239-001.

Thus a single operator can independently manipulate the carriers 100 on each separate boom arm 30 for quickly and easily grasping and manipulating such unwieldy loads as a beef quarter. Furthermore, the simulated motion control feature enables an operator to become proficient in a minimum of time. Thus there has been shown and described a load handling apparatus and carrier apparatus which accomplish at least all of the stated objects.

I claim:

1. A carrier apparatus adapted to be mounted on an elongated boom arm for handling beef quarters and like loads, comprising, an upstanding rear wall structure having forward and rearward surfaces, upper and lower ends and opposite sides, support means on the rearward side of said wall structure for securing said wall structure to a boom arm, a load support platform operatively connected to said rear wall structure adjacent the lower end thereof and extended forwardly therefrom, a side member operatively connected to and extended forwardly from one side of said rear wall structure, and gate means operatively supported on said rear wall structure for movement between a loading position wherein said gate means is displaced from the forward surface of said wall structure so that a load may be received on said platform in leaning engagement against said rear wall, and a carrying position wherein said gate means is extended forwardly of and laterally across the forward surface of said wall structure for at least partially enclosing a load between said side member, wall structure and gate means, said rear wall structure being generally arcuate in top crosssection, the forward surface thereof being concave, said gate means substantially conforming to the rearward surface of said wall structure, and said gate means being circumferentially moved relative to said wall structure between the loading and carrying positions therefor whereby in the loading position, said gate means is positioned substantially rearwardly of said wall structure.

2. The carrier apparatus of claim 1 further comprising a drive wheel rotatably supported on the rearward surface of said wall structure, said drive wheel being engaged with said gate means such that said gate means is moved circumferentially of said rearward surface in response to rotation of said drive wheel.

3. The carrier apparatus of claim 2 wherein said drive wheel comprises a pinion gear and said gate means includes a rack positioned in engagement with said pinion gear.

4. A carrier apparatus for handling beef quarters and like loads, said carrier apparatus adapted to be mounted on an elongated boom arm capable of rotational movement about a longitudinal axis thereof, comprising, an upstanding rear wall structure having forward and rearward surfaces, upper and lower ends and opposite sides, support means on the rearward side of said wall structure for securing said wall structure to a boom arm, a load support platform operatively connected to said rear wall structure adjacent the lower end thereof and extended forwardly therefrom, a side member operatively connected to and extended forwardly from one side of said rear wall structure, gate means operatively supported on said rear wall structure for movement between a loading position wherein said gate means is displaced from the forward surface of said wall structure so that a load may be received on said platform in leaning engagement against said rear wall, and a carrying position wherein said gate means is extended forwardly of and laterally across the forward surface of said wall structure for at least partially enclosing a load between said side member, wall structure and gate means, and said platform being generally arcuate in transverse cross-section and having a concave surface thereof facing upwardly whereby, upon securement of said carrier apparatus to a boom arm, said platform is operative to scoop up a beef quarter and like loads at various rotational positions of said carrier apparatus relative to the longitudinal axis of said boom arm.

5. The carrier apparatus of claim 4 further comprising guide means for supporting said gate means for movement between the loading and carrying positions therefor.

6. The carrier apparatus of claim 5 wherein said guide means comprises a plurality of upper and lower guide rollers.

7. The carrier apparatus of claim 4 further comprising power means for moving said gate means between the loading and carrying positions therefor.

8. The carrier apparatus of claim 4 wherein said rear wall structure is generally arcuate in top cross section, the forward surface thereof being concave.

* * * * *